United States Patent
Shimizu

(10) Patent No.: US 6,848,831 B2
(45) Date of Patent: Feb. 1, 2005

(54) ROTATION SHAFT SUPPORT STRUCTURE OF A MOTOR/GENERATOR

(75) Inventor: Hirofumi Shimizu, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/115,093

(22) Filed: Apr. 4, 2002

(65) Prior Publication Data

US 2002/0168126 A1 Nov. 14, 2002

(30) Foreign Application Priority Data

May 11, 2001 (JP) .......................................... 2001/141790

(51) Int. Cl.⁷ ............................................. F16C 19/08
(52) U.S. Cl. ...................................................... 384/517
(58) Field of Search ................................. 384/517, 518, 384/563, 535, 581

(56) References Cited

U.S. PATENT DOCUMENTS 4,173,376 A 11/1979 Standing et al.
5,316,393 A 5/1994 Daugherty

FOREIGN PATENT DOCUMENTS

JP 2000-87964 3/2000

*Primary Examiner*—Lenard A. Footland
(74) *Attorney, Agent, or Firm*—Foley & Lardner LLP

(57) ABSTRACT

Bearings (5, 7) fixed to the two ends of a rotation shaft (2) of a motor/generator are pressurized by plate springs 15, 17. The plate springs (15, 17) absorb the deflection off the rotation shaft (2) due to external vibration by the extension and contraction. An effective gaps L is set to value at which the bearings (5, 7) do not collide with the housing (9) in the most compressed state of the plate springs (15, 17). By this setting, the effective gap L is set to a value larger than the maximum amplitude in the direction of the rotation shaft (2) due to the external vibration.

3 Claims, 4 Drawing Sheets

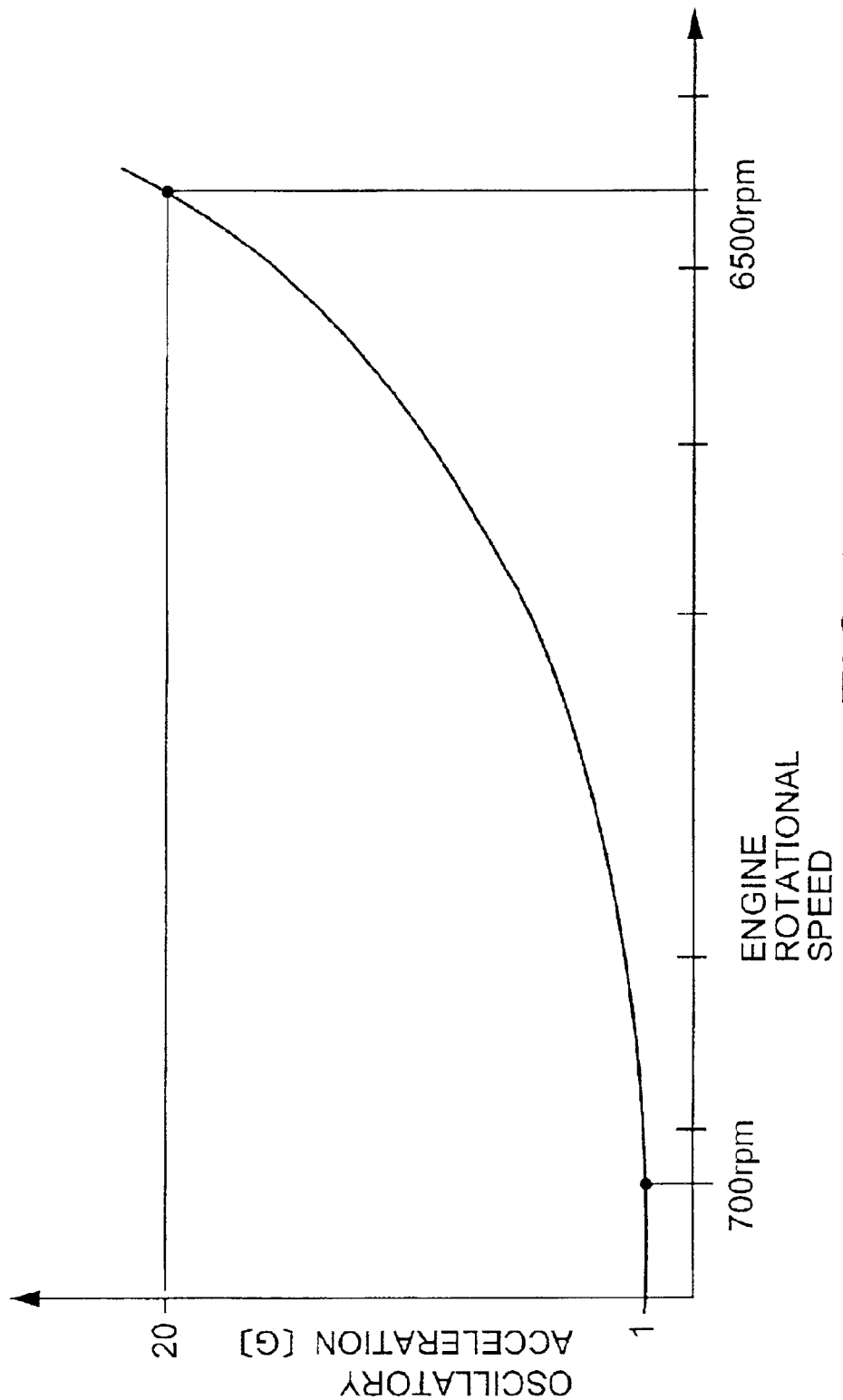

ROTATION SHAFT SUPPORT STRUCTURE OF A MOTOR/GENERATOR

FIELD OF THE INVENTION

This invention relates to a rotation shaft support structure of a motor/generator.

BACKGROUND OF THE INVENTION

Tokkai 2000-87964 published by the Japanese Patent Office in 2000 discloses a rotation shaft support structure of a motor/generator in which pressurizing members are interposed between a housing and bearings that support the rotation shaft.

In this rotation shaft support structure, the bearings fixed to the rotation shaft are supported to slide in the axial direction when a relative force acts in this direction between the rotation shaft or housing. The pressurizing members reduce the vibration of the rotation shaft by absorbing the displacement of the bearings due to the extension and contraction of the pressurizing member.

SUMMARY OF THE INVENTION

In this rotation shaft support structure, a gap distance between the rotation shaft end face and the housing is not considered. Therefore, if the gap distance between the rotation shaft end face and the housing is smaller than a suitable gap, the rotation shaft collides with the housing before the deflection is completely absorbed by the compression of the pressurizing members.

On the other hand, if the gap distance is larger than the suitable gap, the rotation shaft moves beyond the extension-contraction range of the pressurizing members when a large deflection is applied. Thus, the pressurizing member no longer pressurizes the bearing at one end. When this occurs, a shock is applied to the bearings and the bearings wear down early.

It is therefore an object of this invention to provide a rotation shaft support structure having a suitable gap distance between the rotation shaft end face and the housing.

To achieve the object above, this invention provides a support structure of a rotation shaft of a motor/generator connected to an external device. The rotation shaft has two ends. The structure comprises a pair of bearings respectively fitted to the ends of the rotation shaft, each of the bearings having an end face perpendicular to the rotation shaft, a housing having bearing fitting parts that respectively support the bearings, the fitting parts allowing a displacement of the bearings in an axial direction of the rotation shaft, and a pair of pressurizing members each of which is disposed between the end face of each of the bearings and the housing. An effective gap between the end face of each of the bearings and the housing is set to be larger than a maximum amplitude of vibration of the rotation shaft in the axial direction caused by the external device.

The details as well as other features and advantages of this invention are set forth in the remainder of the specification and are shown in the accompanying drawings.

BRIEF DESCRIPTION OF THE DRAWINGS

FIG. 4 is graph describing the vibration characteristics of an engine of the hybrid system of FIG. 3.

DESCRIPTION OF THE PREFERRED EMBODIMENTS

Figure 1:
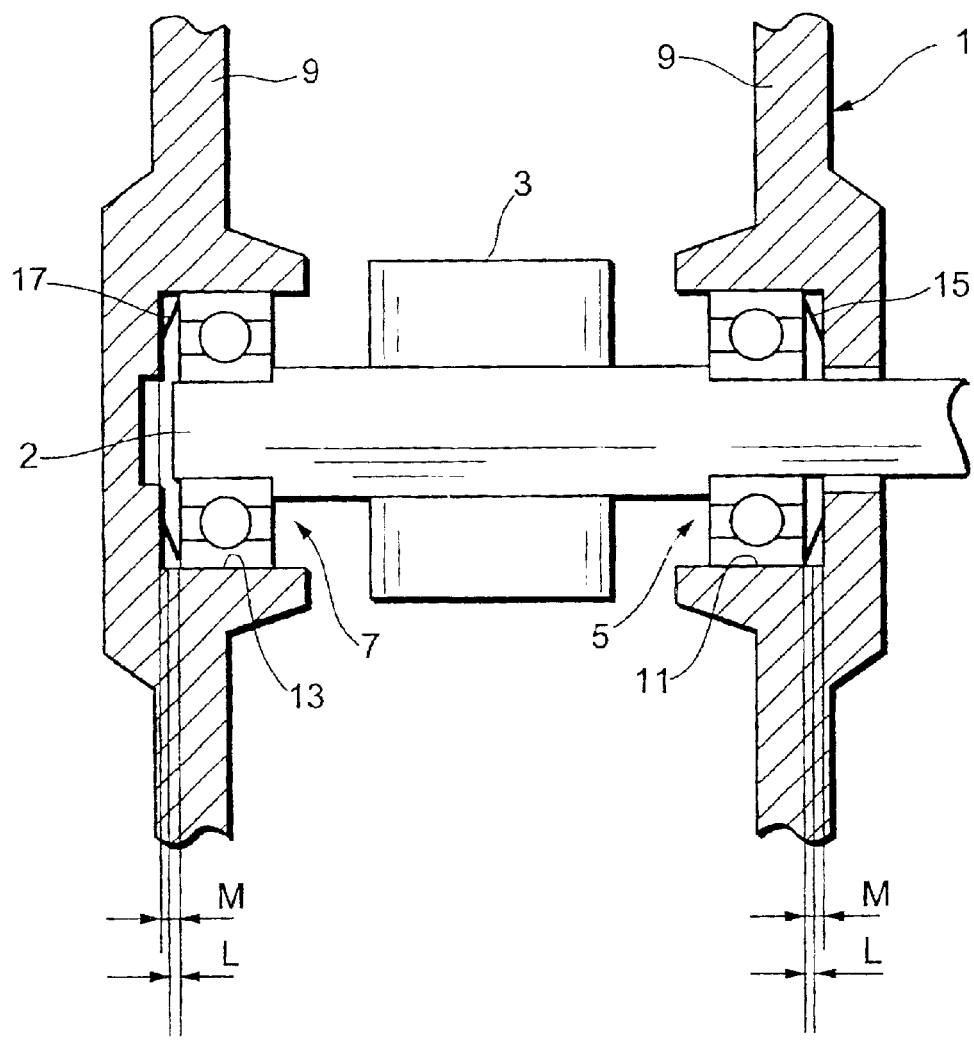
FIG. 1 is a schematic diagram of a rotation shaft support structure of a motor/generator according to this invention.

Referring to FIG. 1 of the drawings, a rotation shaft support structure of a motor/generator 1 according to this invention comprises a housing 9, a rotation shaft 2, a rotating body 3, plate springs 15, 17, and ball bearings 5, 7.

The rotating body 3 is fixed to the rotation shaft 2 and rotates together with the rotation shaft 2. The rotation shaft 2 fits in the inner races of the ball bearings 5, 7. Bearing fitting parts 11, 13 of the housing 9 support the outer races of the ball bearings 5, 7 to allow the ball bearings 5, 7 slide in the axial direction of rotation shaft 2. Plate springs 15, 17 which are pressurizing members are interposed between the housing 9 and ball bearings 5, 7. The plate spring 15 pressurizes the ball bearing 5 toward the ball bearing 7. The plate spring 17 pressurizes the ball bearing 7 toward the ball bearing 5.

Since this rotation shaft support structure allows the ball bearings 5, 7 to slide in the axial direction of rotation shaft, when an axial force in the direction of rotation shaft acts on the rotation shaft 2 or the housing 9, the ball bearings 5, 7 fixed to the rotation shaft 2 slide in the axial direction of rotation shaft.

The rotation shaft support structure has apparent gaps M in the axial direction of rotation shaft between the ball bearings 5, 7 and the housing 9. However, the actual sliding distances of the ball bearings 5, 7 are less than the apparent gaps M. The effective gaps L which show the sliding distances of the ball bearings 5, 7 are expressed by the following expression.

$$L = M - D,$$

where D=thickness of plate springs 15, 17 when most compressed

Hence, the effective gaps L are set to a value larger than the maximum amplitude of the deflection applied to the motor/generator 1. By setting in this manner, the effective gaps L supply distances for the plate springs 15, 17 to absorb the vibration energy when the rotation shaft 2 displaces in the axial direction.

Therefore, this effective gaps L are the gaps required to prevent the end faces of the ball bearings 5, 7 from colliding with the housing 9.

On the other hand, if the effective gaps L are too large, the ball bearings 5, 7 slide beyond the extension-contraction range of the plate springs 15, 17 when a large vibration force is applied. That is, if the ball bearing 5 displaces to compress the plate spring 15, the end face of the ball bearing 7 loses contact with the plate spring 17, and an extra gap will be formed between the end face of the ball bearing 7 and the plate spring 17. Conversely, when the rotation shaft 2 displaces in the direction of the plate spring 17, the end face of the bearing 7 which has separated from the plate spring 17 collides with the plate spring 17.

When the above phenomenon occurs, the ball bearings 5, 7 suffers wear due to shocks. Therefore, the apparent gaps M must be set to a value which does not exceed the thickness of the plate springs 15, 17 when fully extended so that this phenomenon does not occur.

Figure 2:
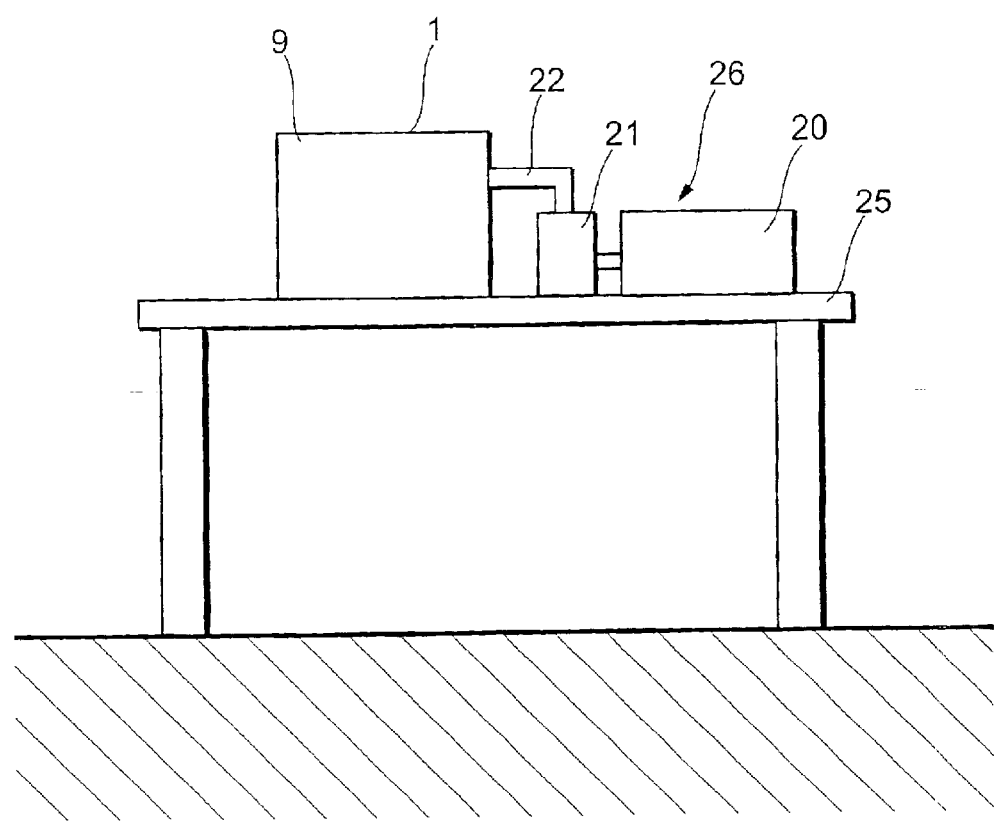
FIG. 2 is a schematic diagram of a lubricating oil system with the motor/generator according to this invention.

Next, referring to FIG. 2, the method of calculating the effective gaps L in a case where the motor/generator 1 is provided with the lubrication oil feeder for the ball bearings 5, 7, will be described.

A platform 25 mounts the motor/generator 1 and a pump unit 26 comprising a motor 20 and a pump 21. The pump unit 26 is connected to the motor/generator 1 via an oil pipe 22 to supply lubrication oil to the bearings 5, 7 of the motor/generator 1.

The vibration of the pump unit 26 is transmitted to the housing 9 of the motor/generator 1 via the platform 25 and the oil pipe 22.

Here, let the mass of the housing 9 of the motor/generator 1 be Mh, the mass of the platform 25 be Md, the mass of the rotor of the pump unit 26 be Mr, the eccentricity of the rotor of the motor 20 be E, the angular velocity of the rotor of the motor 20 be and the time be T. The centrifugal force F is generally expressed by the following expression using the terms E, Mr, E, and ω.

$$F = Mr \times E \times \omega^2 \times \sin(\omega T). \qquad (1)$$

Since the housing 9 and the platform 25 are rigidly bound, the housing 9 and the platform 25 vibrate together. If the acceleration of the vibration acting on this housing 9 and platform 25 is set to A, the equation of the motion of vibration is expressed by the following expression.

$$F = (Mh + Md) \times A \qquad (2)$$

Ignoring the mass of the platform 25, the equation (2) becomes the following expression.

$$F = Mh \times A \qquad (3)$$

Next, the following expression for the acceleration of the vibration A is obtained by substituting equation (1) into equation (3).

$$F = (Mr/Mh) \times E \times \omega^2 \times \sin(\omega T) \qquad (4)$$

In order to obtain the equation of a displacement S due to the vibration, the equation (4) is integrated twice.

$$S = -(Mr/Mh) \times E \times \sin(\omega T) \qquad (5)$$

As the term sin (ωT) in equation (5) has a value between −1 and 1, the peak amplitude due to the deflection is (Mr/Mh)×E.

Therefore, according to this embodiment, by setting the effective gaps L to a larger value than (Mr/Mh)×E, collision of the ball bearings 5, 7 and the housing 9 is prevented.

The peak amplitude calculated by the above equation shows the peak amplitude of a vertical component to the rotation shaft 2. However, as the peak amplitude in the axial direction cannot be larger than the peak amplitude of the vertical component of the vibration, the peak amplitude of the perpendicular component may be regarded as the peak amplitude value in the axial direction of rotation shaft.

Moreover, this invention can also be applied to a lubricating oil device wherein the pump unit 26 is arranged vertically.

Figure 3:
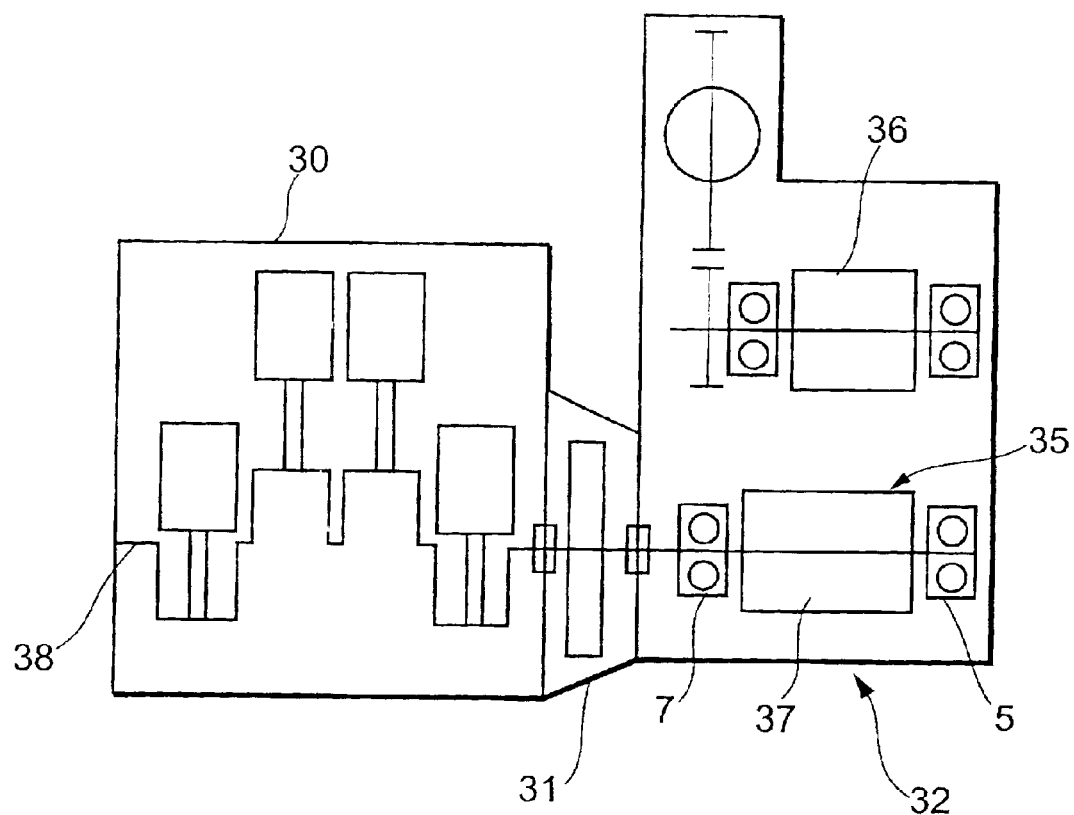
FIG. 3 is a schematic diagram of a hybrid system for a vehicle with a motor/generator according to a second embodiment of this invention.

Next, referring to FIG. 3, a second embodiment of this invention will be described.

This embodiment relates to the setting of the effective gaps L of a generator 35 comprising the rotation shaft support structure according to this invention. The generator 35 is provided as a part of a hybrid system for a vehicle.

This hybrid system comprises a four-cylinder engine 30, a damper housing 31, and a hybrid unit 32 comprising the generator 35 and a motor 36. The generator 35 supports a rotor 37 with the rotation shaft support structure according to this invention.

The crankshaft 38 of the engine 30 is jointed with the rotor 37 of the generator 35 via a damper housing 31.

This crankshaft 38 transmits the rotational torque generated by the engine 30 to the rotor 37 of the generator 35. The generator 35 generates electric power by using this torque, and supplies the generated electric power to the motor 36 to drive the vehicle.

In the four-cylinder engine 30, combustion is performed once in each cylinder during two rotations of the engine 30, and overall, combustion takes place twice for each rotation of the engine 30. As this combustion is the cause of the vibration of the engine 30, the engine 30 has the vibration characteristics shown in FIG. 4 relative to engine rotation speed. The oscillatory acceleration shown in the figure is expressed in a unit G that is the gravitational acceleration, where $1G = 9.8 \text{ m/sec}^2$.

Here, let the engine rotation speed of the engine 30 be R, the oscillatory acceleration relative to the engine rotation speed R be P, the number of cylinders of the engine be N, the number of combustions per engine rotation be N/2, the time be T and the vibratory acceleration relative to time be A (T). Using the above terms R, P, N, and T, the vibratory acceleration relative to time A (T) is expressed by the following expression.

$$A(T) = P \times 9.8 \times \sin\{2 \times (R/60) \times 2\pi \times T\} \qquad (6)$$

As mentioned above, the displacement S (T) relative to time is obtained by integrating the equation (6) twice.

$$S(T) = [-P \times 9.8/\{2 \times (R/60) \times 2\pi\} 2 \times \sin\{2 \times (R/60) \times 2\pi \times T\} \qquad (7)$$

As the term $\sin\{2 \times (R/60) \times 2\pi \times T\}$ in equation (7) is a value between −1 and 1, the peak amplitude due to the vibration is given as:

$$S = -P \times 9.8/\{2 \times (R/60) \times 2\pi\}^2 \qquad (8)$$

For example, the peak amplitude when the rotation speed of the engine 30 is 700 rpm, is calculated. In this case, R=700 rpm and from FIG. 14 P=1. By substituting these values in the equation (8), the peak amplitude at 700 rpm of the engine rotation speed is obtained as follows.

$$S = -1 \times 9.8/\{2 \times (700/60) \times 2\pi\}_2 = 0.46 \text{ mm} \qquad (9)$$

Next, the peak amplitude when the engine rotation speed of the engine 30 is 6500 rpm is also obtained as described below.

$$S = -1 \times 9.8/\{2 \times (6500/60) \times 2\pi\}^2 = 0.11 \text{ mm} \qquad (10)$$

Therefore, the peak amplitude when the engine rotation speed is 700 rpm is 0.46 mm, and the peak amplitude when the engine rotation speed is 6500 rpm is 0.11 mm.

As this engine 30 rotates from an idle engine rotation speed of 700 rpm to a maximum rotation speed of 6500 rpm, the amplitude S of the crankshaft 38 in this rotation speed region is a value between 0.11 mm and 0.46 mm. That is, the peak amplitude of the shaft 38 in this rotation speed region is 0.46 mm. As the rotor 37 of the generator 35 is jointed to the shaft 38 of the engine 30, the peak amplitude of the rotor 37 is the same as the peak amplitude of the shaft 38. Thus, the collision between the ball bearings 5, 7 of the generator 35 and the housing 9 can be prevented by setting the effective gaps L of the rotation shaft support structure of the generator 35 to a value larger than 0.46 mm.

In above calculation of the effective gaps L, the friction between the ball bearings 5, 7 and bearing fitting parts 11, 13, and the stiffness of the plate springs 15, 17 are not considered to simplify the equation. In order to calculate a more accurate effective gaps L, it is necessary to consider the friction between the bearings 5, 7 and the bearing fitting parts 11, 13, and the stiffness of the plate springs 15, 17.

In the second embodiment, let the mass of the rotor 37 of the generator 35 be Mb, the frictional coefficient be C, the stiffness of the plate springs 15, 17 be K, the vibratory speed of the rotor 37 be V, and the deformation of the plate springs 15, 17 be Y. Expressing the motion of rotor 37 of the generator 35 using the above terms Mb, C, K, V, A, P and Y may follow the relationship below.

$$Mb \times A + C \times V + K \times Y = Mb \times P \times 9.8 \times \sin\{2 \times (R/60) \times 2\pi \times T\} \quad (11)$$

The values of the frictional coefficient C and the stiffness K can be obtained by the experiment.

By simulating the equation (11), the displacement Y of the plate springs 15, 17 with respective to time can be obtained. The effective gaps L are computed by taking the maximum deformation of the plate springs 15, 17 as the peak amplitude.

The rotation shaft support structure of this invention is generally referred to as a spring-mass system, and has a characteristic which induces resonance with a certain resonance frequency. Here, using the stiffness K and the mass of the body Mc, the resonance frequency H is expressed by the following expression.

$$H = (K/Mc)^{1/2} \quad (12)$$

If a vibration is applied at a frequency near the resonance frequency H, the body vibrates greater than the peak amplitude of the applied vibration. Therefore, if the rotation shaft support structure according to this invention starts to resonate, the ball bearings 5, 7 slide beyond the distance of the effective gaps L that are calculated by not considering the friction between the ball bearings 5, 7 and bearing fitting parts 11, 13 and the stiffness of the plate springs 15, 17. Thus, the ball bearings 5, 7 may collide with the housing 9.

According to the second embodiment, in order to prevent this resonance, the stiffness of the plate springs 15, 17 is set as following steps.

First, the vibration frequency due to the engine 30 when the engine rotation speed of the engine 30 is 700 rpm is calculated by using the following equation.

$$700 \times (2/60) = 23.2 [Hz] \quad (13)$$

Next, the vibration frequency due to the engine 30 when the engine rotation speed of the engine 30 is 6500 rpm is calculated by using the following equation.

$$6500 \times (2/60) = 217 [Hz] \quad (14)$$

As described above, since the normal engine rotation speed of the engine 30 ranges from 700 rpm to 6500 rpm, the frequency of vibration generated by the engine 30 in the normal engine rotation speed region ranges from 23.2 Hz to 217 Hz. Therefore, the stiffness of the plate springs 15, 17 is determined to make the resonance frequency H of the rotation shaft support structure out of the calculated vibration frequency range. If the idle rotation speed is Nei, the calculation equation for the stiffness of the plate springs 15, 17 is expressed by the following expression.

$$(Nei/60) \times (N/2) \geq (K/Mb)^{1/2} \quad (15)$$

It is preferred that the stiffness of the plate springs 15, 17 is determined to make the resonance frequency occur below the idle rotation speed of 700 rpm of the engine 30.

The entire contents of Japanese Patent Application P2001-141790 (filed on May 11, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A support structure of a rotation shaft of a motor/generator connected to an external device, the rotation shaft having two ends, the structure comprising:

a pair of bearings respectively fitted to the ends of the rotation shaft, each of the bearings having an end face perpendicular to the rotation shaft;

a housing having bearing fitting parts that respectively support the bearings, the fitting parts allowing a displacement of the bearings in an axial direction of the rotation shaft; and a pair of pressurizing members each of which is disposed between the end face of each of the bearings and the housing, wherein the motor/generator is provided with a rotating body supported by the rotation shaft, the external device is an engine having a crankshaft connected to the rotation shaft, and the pressurizing member has a stiffness defined by a relation on resonance frequency of $(Nei/60) \times (N/2) \geq (K/Mb)^{1/2}$, wherein K is a stiffness of one of the pressurizing members, Nei is an idle rotation speed of the engine, N is a number of cylinders of the engine, and Mb is a mass of the rotating body.

2. The support structure as defined in claim 1, wherein the rotating body has a resonance frequency smaller than a vibration frequency of the external device.

3. A support structure for a motor/generator rotation shaft, comprising:

a shaft member connected to a crankshaft of an engine, wherein the shaft member supports a rotating body;

a first support and a second support, wherein the shaft is rotatably mounted on the first and second supports and wherein the first and second supports are configured to permit axial movement of the shaft;

a housing for supporting the first and second supports;

a first spring member disposed between the first support and the housing; and a second spring member disposed between the second support and the housing, wherein a stiffness of the first and second spring members is configured such that a resonance frequency of the support structure is below an idle speed of the engine, and wherein the stiffness is defined by $(Nei/60) \times (N/2) \geq (K/Mb)^{1/2}$, wherein K is a stiffness of at least one of the first or second support members, Nei is an idle rotation speed of the engine, N is a number of cylinders of the engine, and Mb is a mass of the rotating body.

* * * * *